INVENTOR.
CARL OSCAR SCHMIDT, JR.
BY
J. Warren Kinney, Jr.
ATTORNEY

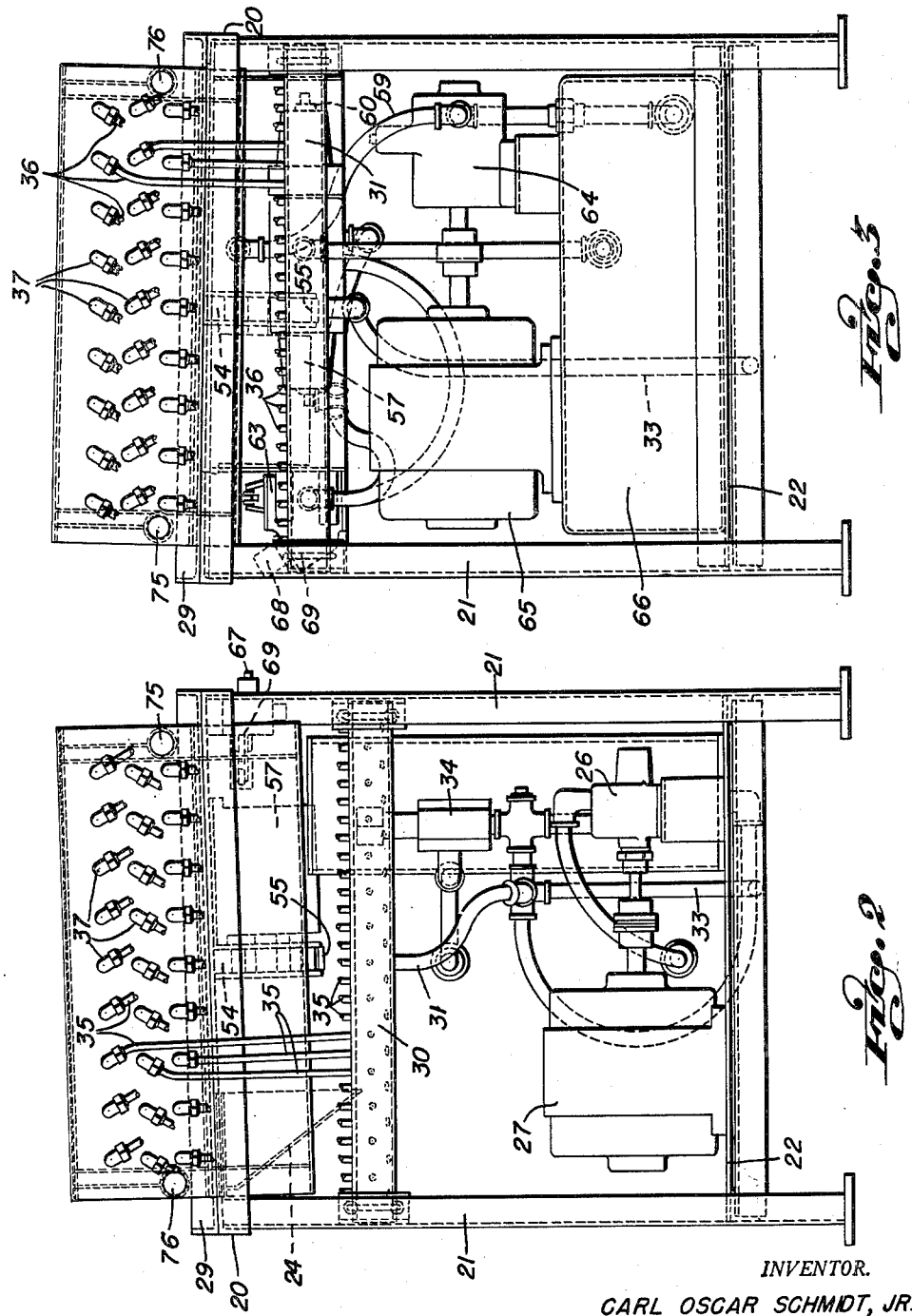

March 19, 1963 C. O. SCHMIDT, JR 3,081,691
INJECTION APPARATUS FOR THE TREATMENT OF MEAT
Filed Oct. 6, 1959 4 Sheets-Sheet 3
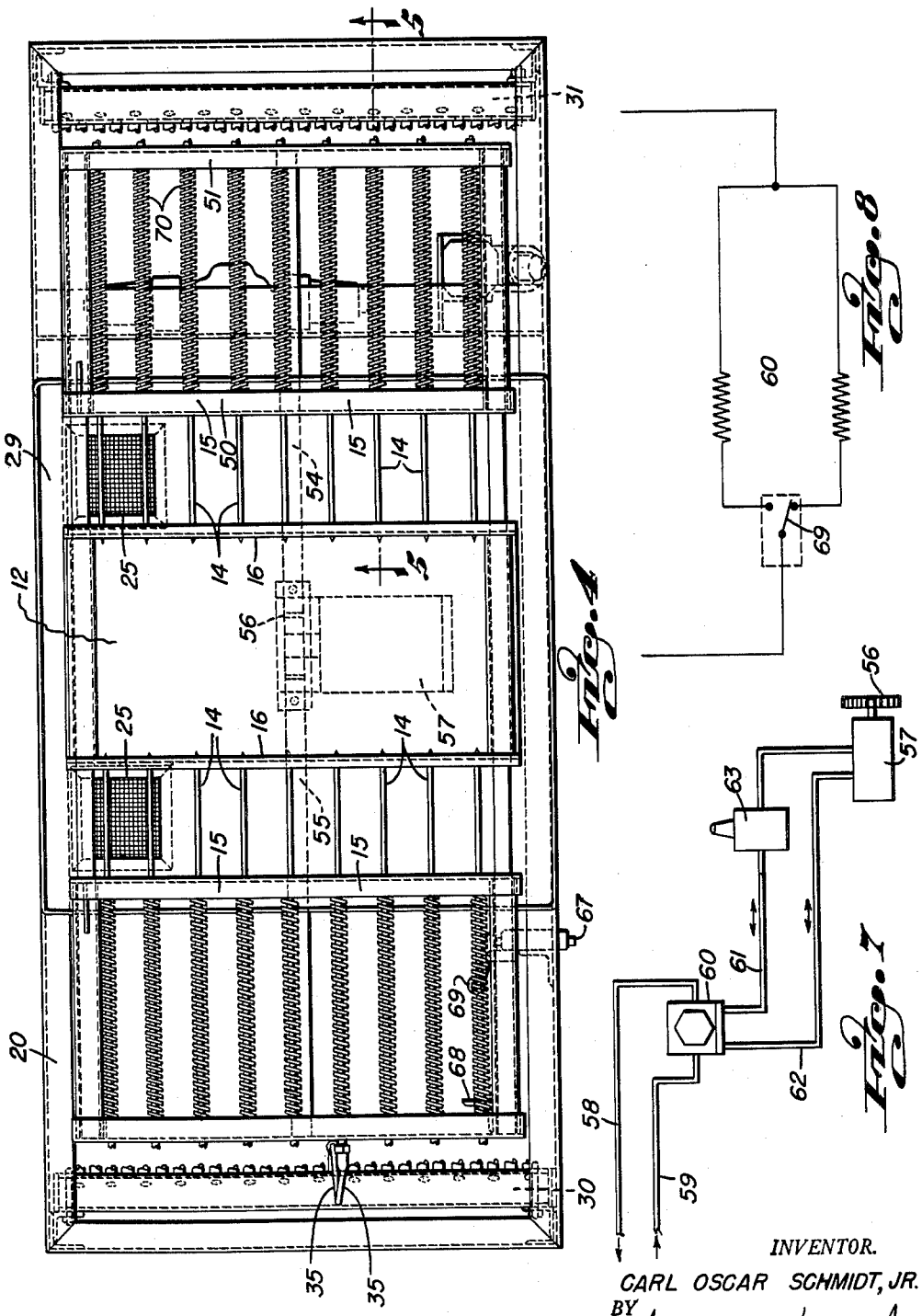
INVENTOR.
CARL OSCAR SCHMIDT, JR.
BY
ATTORNEY

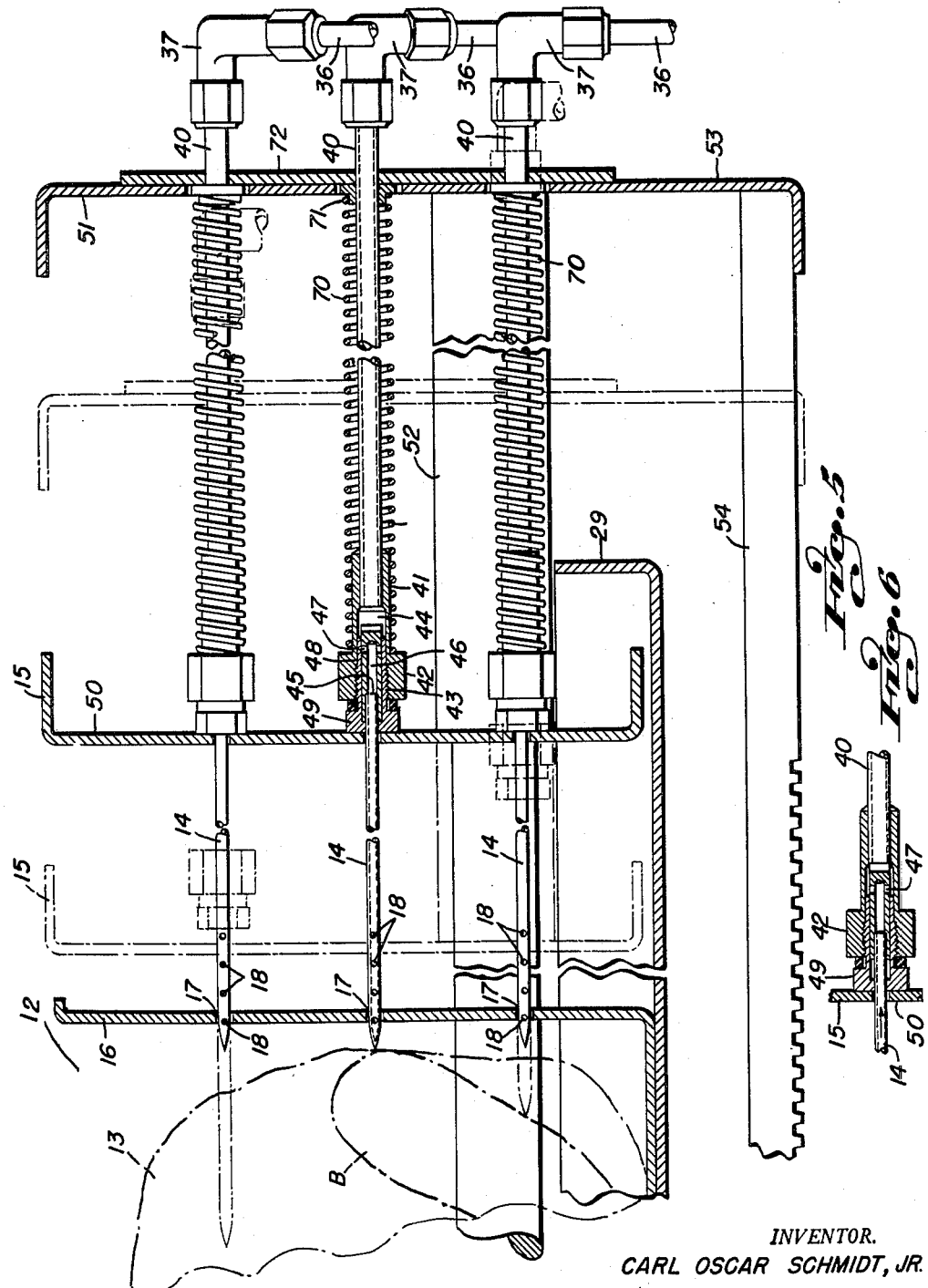

United States Patent Office 3,081,691
Patented Mar. 19, 1963

3,081,691
INJECTION APPARATUS FOR THE TREATMENT OF MEAT
Carl Oscar Schmidt, Jr., Wyoming, Ohio, assignor to The Cincinnati Butcher's Supply Company, Cincinnati, Ohio, a corporation of Ohio
Filed Oct. 6, 1959, Ser. No. 844,704
8 Claims. (Cl. 99—257)

This invention relates to injection apparatus for the treatment of meat in chunk form, to preserve, flavor, or tenderize the meat. Such treatment generally is applied to hams, for example, into which a brine or pickling fluid is injected.

An object of the invention is to facilitate and expedite the operation of injecting treating fluids into meat chunks.

Another object is to provide a simple and effective apparatus to perform a meat injection operation, with substantial savings of time, expense and labor.

A further object of the invention is to provide a machine or apparatus for the purpose stated, which is for the most part automatic in operation and easy to manipulate.

The foregoing and other objects are attained by the means described herein and illustrated upon the accompanying drawings, in which:

FIG. 2 is an end view of the device illustrated by FIG. 1, as viewed from left to right.

FIG. 3 is an end view as viewed from right to left of FIG. 1.

FIG. 4 is a top plan view of the apparatus.

FIG. 5 is an enlarged cross-sectional view taken on line 5—5 of FIG. 4.

FIG. 6 is a fragmental detail view of a control valve, shown in cross-section, indicating an open condition of the valve.

FIG. 7 is a diagrammatic view of a hydraulic system forming part of the apparatus.

FIG. 8 is a wiring diagram for the electric controls of the apparatus.

Figure 1:
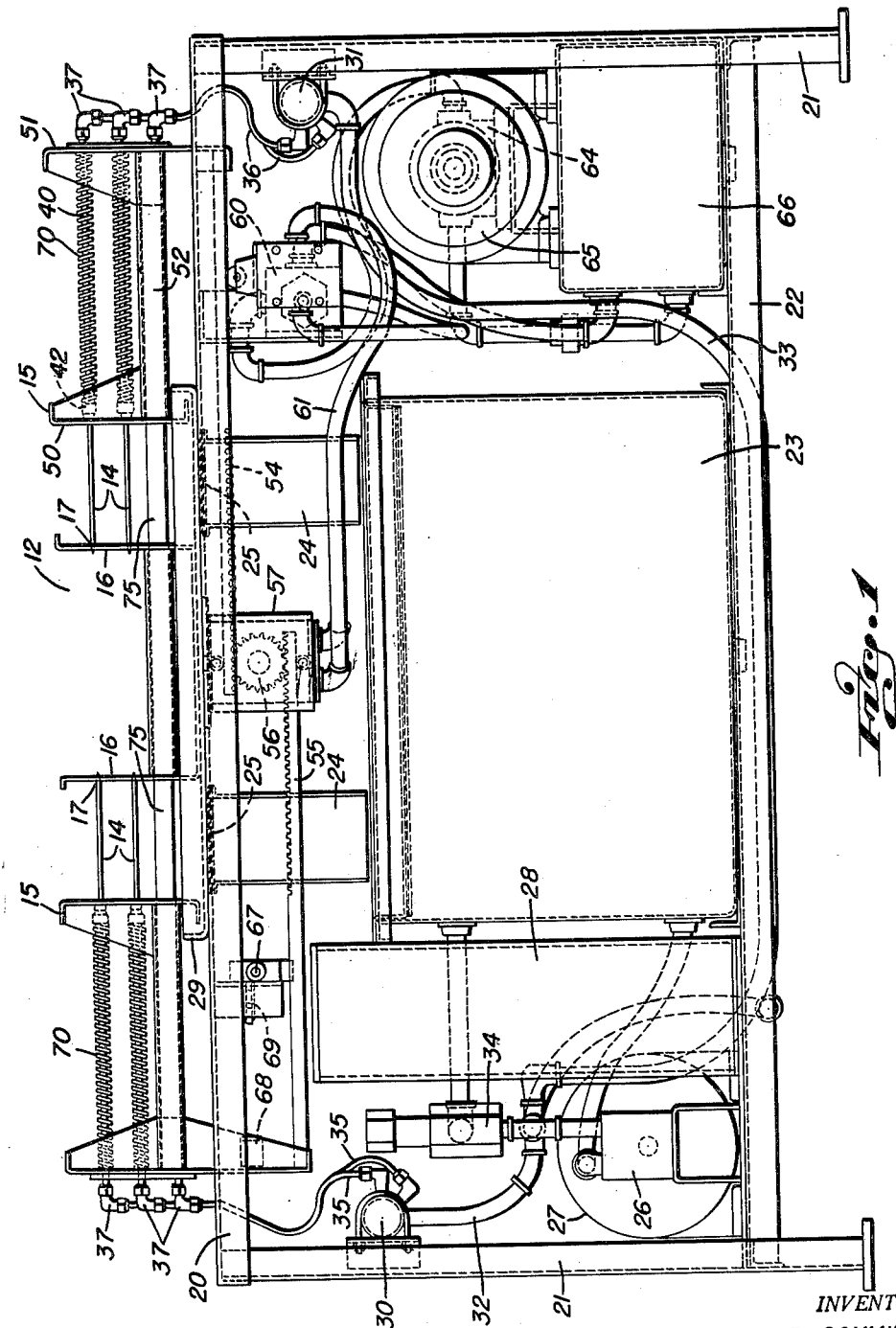
FIG. 1 is a front elevational view of the injection apparatus embodying the present invention.

The device comprises in brief, a station or compartment 12 in which a ham or other meat chunk 13 (FIG. 5) may be deposited, either manually or by conveyor, preparatory to injection of treating fluid. At opposite sides of the compartment are mounted groups or batteries of hollow injection needles 14, which are normally retracted as shown in FIGS. 1 and 4, but which may be advanced toward and into the meat chunk contained within the compartment 12. The needles advance from opposite sides of the compartment and enter the meat, whereupon treating fluid under pressure within the needles is discharged through orifices in the needles and permeates the meat. Thereafter the needles are withdrawn, with concurrent shut-off of the treating fluid. The meat chunk may then be removed from the compartment, in preparation for another operation.

In accordance with the invention, each battery of needles is mounted upon a transverse needle support member or carriage 15, which may be reciprocated bodily lengthwise of the machine, to advance and retract the needles unitarily relative to the compartment 12. The side walls 16 of the compartment may be provided with apertures 17 serving as guides or lateral supports for the needles, as the needles are advanced and retracted therethrough. The individual needles are each provided with a valve, which is normally closed to prevent feed of fluid to the needle orifices 18 until such time as the needle point impinges against a meat chunk, to open the valve. Thus, any needle which in advancing fails to contact the meat chunk, will not discharge treating fluid. Moreover, withdrawal of such needles as entered or contacted the meat chunk will result in closing the valves and terminating the flow of fluid, as will be explained in greater detail hereinafter.

The apparatus may comprise a frame 20 mounted upon legs 21 which support also a lower shelf 22 that carries much of the operating mechanism. Upon shelf 22, for example, may be mounted the large central reservoir 23 which catches all excess treating fluid discharged from the injection needles, the excess being directed to the reservoir by a pan 29 and chutes or gutters 24 equipped with strainers 25. Adjacent to the reservoir may be located a pump 26, driven by an electric motor 27, which removes treating fluid from the reservoir, charges the accumulator 28, and directs treating fluid under pressure to the two manifolds or needle headers 30 and 31 at opposite ends of the machine, by way of hoses or pipes 32 and 33. The system may include also a pressure control valve 34 to regulate the flow to the manifolds.

To the manifold or header 30 is attached a series of flexible hoses 35 equal in number to the number of injection needles located at one end of the machine, and each hose feeds treating fluid under pressure to one of the needles. Similarly, at the opposite end of the machine, flexible hoses 36 convey treating fluid from manifold 31 to the individual injection needles at that end of the machine. Coupling means between the hoses and the injection needles are indicated by the reference character 37. In FIGS. 2 and 3 most of the flexible hoses 35 and 36 are shown broken away in the interest of clarity of the disclosure, but it will readily be understood that each needle coupling 37 has a separate hose connection with the adjacent manifold 30 or 31.

With reference to FIG. 5, it will be noted that each coupling 37 has connection with a straight supply tube 40 for treating fluid, these tubes each being arranged to feed an injection needle 14. As all the tubes and needles are identical, a description of one such assembly will suffice for the others also.

In FIG. 5, the tube 40 carries at its forward end a fixed hollow valve body 41, having a nut-shaped enlargement 42 interiorly threaded at 43, the body being counterbored at 44 to provide a chamber in fluid communication with the longitudinal bore of tube 40.

Needle 14 has an open end 45, surrounded by a hollow slide valve element 46 which is fixed to the adjacent needle end portion. The slide valve element has formed therein one or more lateral ports 47 which normally are covered by a valve sleeve 48 in which the slide valve element 46 may reciprocate bodily with the needle 14, to cover and uncover the port 47. Sleeve 48 has a nut end 49 integral with the sleeve, the latter having threaded connection at 43 with the valve body 41.

From the foregoing, it will be understood that the valve as shown in FIG. 5 is closed, since the port 47 is covered by sleeve 48. However, upon lengthwise shifting of needle 14 and its connected slide element 46 to the right, the port 47 will be moved beyond the sleeve 48 for placing the hollow interior of slide element 46 and needle 14 in fluid communication with counterbore 44, thereby to effect a feed of treating fluid from tube 40 to the orifices 18 at the forward end of the needle. The open condition of the valve is shown in FIG. 6.

It may here be noted that pressure of fluid from tube 40 acts constantly upon the closed end of slide valve element 46, to yieldingly urge the vlave toward closed position. This force, however, is overcome when the needle end strikes and enters the meat chunk 13, causing the needle to shift relatively rearwardly or to the right for opening the valve and feeding treating fluid to the needle orifices 18.

In the operation of the machine, FIG. 5, the needle support member or carriage 15 is adapted to be shifted bodily in the direction of the meat chunk 13 in compartment 12, for advancing the needles toward and into the meat chunk. The member or carriage 15 may comprise a frame constituted of the upright spaced plates 50 and 51 connected together by a rail 52. To a depending portion 53 of the carriage may be fixed one end of a toothed rack 54 or equivalent actuator, adapted to be power-reciprocated for imparting advancing and retactile movements to the carriage. A similar rack or actuator 55 (FIG. 1), may be provided for shifting the opposing carriage at the left end of the machine. Both racks may engage a gear 56 on the shaft of a reversible motor 57, so that upon rotation of the motor shaft in opposite directions, the racks will act to advance the needle carriages in unison, or retract them in unison.

Motor 57 as herein depicted is of the hydraulic type, although in practice a motor operated electrically or otherwise might be employed. The hydraulic system for motor 57 is shown digrammatically upon FIG. 7, wherein 58 and 59 indicate the pipe lines to and from an hydraulic pump 64 terminating at a solenoid valve 60 which controls the direction of fluid flow through pipes 61 and 62, and motor 57. A speed control valve is indicated at 63, and the hydraulic pump motor, at 65, draws from a hydraulic fluid reservoir 66.

When the operator desires to actuate the needle carriages toward one another, he momentarily depresses an electric switch 67 which energizes the solenoid valve 60. Valve 60, which is a four-way valve, thereupon is conditioned to direct hydraulic fluid under pressure to the fluid motor for driving the motor in proper direction for drawing the racks 54 and 55 centerward, thereby to advance the carriages 15—15 and the injection needles 14. Upon reaching their limit of advancement, the carriages are returned to the normal or home position of FIG. 1, by automatic means. Such automatic means may comprise a stop 68 fixed to one of the carriages, shown at the left in FIG. 1, which stop moves with the carriage until it trips the solenoid switch 69, which in turn actuates the solenoid valve 60 to reverse the direction of hydraulic flow through the carriage driving motor 57. Such reversal of motor 57 thereupon extends the racks 54 and 55, to withdraw the carriages 15 to home or normally retracted position. The characters 75 and 76 indicate rails upon which the carriages slide.

Reverting now to FIG. 5, it should be noted that each injection needle 14 is yieldingly kept projected by means of a compression spring 70 surrounding the treating fluid supply tube 40. One end 71 of each spring bears against a backing plate 72 attached to carriage member 51, while the opposite end 73 of the spring bears against the valve body enlargement 42. Accordingly, when the carriage 15 of FIG. 5 is advanced toward the left by the action of rack 54, all needles of the carriage will advance with the carriage. Some of the needles may penetrate the meat chunk 13, as shown, whereas others may miss it, particularly if the meat chunk is small in mass.

Those needles which contact or penetrate the meat chunk will slide back slightly into the valve body, thereby to unseat their valves 46 for releasing treating fluid to the needle orifices 18. This limited shifting of the needles may be referred to as a secondary reciprocation of the needles, as contrasted with the primary reciprocation induced by the carriage movements.

When the carriages reach their limit of advancement as determined by the stop 68 previously referred to, the carriages are driven back to home position by the rack motor 57. Such reversal of the carriages, of course, withdraws the needles from the meat chunk, and at the instant of withdrawal the needles will be momentarily held while the carriages retract, to close the valves 46 and terminate flow of treating fluid into the meat chunk.

Those needles which fail to enter the meat chunk upon advancement of the carriages will not eject treating fluid, due to the absence of a resistive force opposing needle advancement, necessary to unseat the needle valve. On the other hand, needles such as the middle one of FIG. 5, meeting a highly resistive force such as a bone B in the meat chunk, will eject treating fluid, and will in addition remain static while the carriage 15 advances, the motion differential being taken up in the compression spring 70. In such a case, the carriage plate 50 will leave the head 49 of the valve sleeve as the carriage advances. This, of course, avoids needle breakage and other damage to the needles and their valves.

In the case of the lowermost needle 14 of FIG. 5, where the needle partly enters the meat chunk before striking a bone B, fluid ejection will occur, but a halt in the advancement of that needle will be taken up by its spring 70 at an intermediate stage of needle advancement. It will therefore be understood that in the course of an injection operation some needles may eject treating fluid, while others may not, and some needles may advance the full limit of carriage advancement while others may advance a lesser distance. The stated behavior of the needles is dependent upon the size and character of the meat chunk undergoing treatment, and this, of course, enhances the versatility of the apparatus, rendering it effective for treatment of various sizes, shapes, and kinds of meat, irrespective of bone locations therein.

As will be understood, the needle assembly for the carriage at the left end of the apparatus is identical to that at the right end described. It is possible, of course, to eliminate one carriage and its battery of needles should such a construction be considered desirable or sufficient for the treatment of certain forms of meat chunks. As previously stated herein, power other than hydraulic fluid may be employed to reciprocate the carriages, and the electrical control apparatus for initiating operation of the machine may be modified in accordance with any accepted practices applicable to the instant situation, wherein it is considered desirable to initiate a cycle of operation by closing an electrical switch the circuit of which will be opened automatically as the carriages return to home position.

In a suggested modification of the apparatus, meat chunks might be delivered to the apparatus automatically and continuously by conveyor means, and if desired, the delivery of meat chunks to the compartment 12 might be caused to initiate an operating cycle automatically upon such delivery.

The foregoing and various other modifications and changes in structural details of the apparatus may be resorted to, within the scope of the appended claims, without departing from the spirit of the invention.

What I claim is:

1. Injection apparatus for the treatment of meat chunks, comprising in combination, a battery of hollow needles to pierce the meat chunk, said needles having forward end portions provided with orifices for the release of treating fluid into the chunk, a transverse support member upon which the needles are mounted in spaced substantial parallelism, means for reciprocating the support member and the needles thereon toward and from a meat chunk located in the path of movement of the needles, means mounting the needles upon the support member for limited reciprocatory movement relative to the support member, conduit means for supplying treating fluid under pressure to the hollow needles at locations remote from the orifices thereof, a normally closed valve unit for each conduit means including a body and a slide element therein, means operatively coupling each needle with its respective valve unit slide element whereby the valve will be opened by movement of the needle in response to resistance to the movement of the needle toward or into a meat chunk, each valve unit being movable with the needle relative to the support member, and strain relief means operatively connected between said support member and each of said valve units to yield when the support member is advancing toward the chunk when the needle is stopped in its movement by the support member toward the meat chunk, as by impingement upon a bone, whereby other needles may continue to be moved by the support member toward and into the meat chunk.

2. Injection apparatus for the treatment of meat chunks, comprising in combination, a battery of hollow needles to pierce the meat chunk, said needles having forward end portions provided with orifices for the release of treating fluid into the chunk, a transverse needle support member including means to reciprocate said support member toward and from the meat chunk, means mounting the needles upon the support member for secondary reciprocative movement relative thereto individually and in spaced substantial parallelism, a treating fluid supply tube for each needle, said tubes being mounted upon and secured to the needle support member in concentric aligned relationship each with its respective needle, a slide valve within each supply tube supported for movement axially of the tube, said valves each having fixed connection with a needle whereby secondary reciprocation of the needle enforces corresponding sliding movement of the valve, a pair of ports in each valve arranged to register with its respective supply tube upon limited shifting movement of its associated needle resulting from impingement of such needle against the meat chunk, means for restoring the valve to a closed non-registering condition of its ports when the needle is free of contact with the meat chunk, and means feeding a treating fluid under pressure to each supply tube in advance of its associated valve and strain relief means operatively connected between the transverse needle support member and each of said needles maintaining each of the needles in a set position with respect to the other needles and to said transverse needle support member and yielding when the support member is advancing towards the meat chunk when the needle is stopped in its movement by the support member toward the meat chunk, as by impingement upon a bone, whereby other needles may continue to be moved by the support member toward and into a meat chunk.

3. Injection apparatus for the treatment of meat chunks, comprising in combination, means providing a compartment for confining a meat chunk deposited therein, opposed batteries of hollow needles projectable into the compartment from opposite sides to pierce the meat chunk, a transverse needle support member for and supporting each battery of needles and including means to reciprocate the support members and the batteries of needles toward and away from a meat chunk in the compartment, said needles having forward end portions provided with orifices for the release of treating fluid into the meat chunk, means for supplying treating fluid under pressure to the hollow needles, means to advance the opposing batteries of needles unitarily toward one another and into the meat chunk confined within the compartment, and to retract said needles from the chunk, means operatively connected with each of the needles operative to release treating fluid into the meat chunk while the needles are advanced, and separate lost-motion connection means between the said needle support member and each of said needles maintaining each of the needles in a set postion with respect to the other needles and to said needle support member while the needles are being advanced towards a meat chunk and yielding to resistance to the advancement of a needle caused by impingement of the point thereof upon a non-penetratable or difficultly penetratable body such as bone, whereby the needle support member and needles not encountering such resistance, continue to advance a required distance and the needle meeting the resistance is held stationary.

4. Injection apparatus for the treatment of meat chunks, comprising in combination, means providing a compartment for confining a meat chunk deposited therein, opposed batteries of hollow needles projectable into the compartment from opposite sides to pierce the meat chunk, said needles having forward end portions provided with orifices for the release of treating fluid into the chunk, a pair of opposed transverse needle support members including means to reciprocate said members toward and from the meat chunk, means mounting one battery of needles upon each support member for secondary reciprocative movement relative thereto, a treating fluid supply tube for each needle, said tubes being fixed upon the needle support members in concentric aligned relationship each with one of the needles, a slide valve within and movable axially of each supply tube, said valves each having fixed connection with a needle whereby secondary reciprocation of the needle enforces corresponding sliding movement of the valve, a pair of ports in each valve arranged to register with its respective supply tube upon limited shifting movement of its associated needle resulting from impingement of such needle against the meat chunk, means for restoring the valve to a closed non-registering condition of its ports when the needle is free of contact with the meat chunk, means feeding a treating fluid under pressure to each supply tube in advance of its associated valve and separate lost-motion connection means between the transverse needle support members and each of said needles maintaining each of the needles in a set position with respect to the other needles and to said transverse needle support member while the needles are being advanced toward a new chunk and yielding to resistance to the advancement of a needle caused by impingement of a point thereof upon a non-penetratable or difficultly penetratable body such as a bone, whereby the movable member and needles not encountering such resistance continue to advance a required distance and the needle meeting the resistance is held stationary.

5. Injection apparatus for the treatment of meat chunks comprising a battery of separate individual hollow needles to pierce the meat chunk, each of said needles being provided with orifices for the release of treating fluid into the chunk, means supplying treating fluid under pressure to the hollow needles, and movable means for moving the needles into and out of the chunk, each of said individual needles being mounted for reciprocation relative to said movable means and independently of the other needles, and separate lost-motion connection means between said movable means and each of said needles maintaining each of the needles in a set position with respect to the other needles and to said movable means while the needles are being advanced toward a meat chunk and yielding to resistance to the advancement of a needle caused by impingement of the point thereof upon a non-penetratable or difficultly penetratable body such as a bone, whereby the movable means and needles not encountering such resistance continue to advance a required distance and the needle meeting the resistance is held stationary.

6. Apparatus as defined in claim 5, wherein said lost-motion connection comprises a compression spring disposed between the movable means and each of said needles, the motion difference between the movable means and the needles being taken up by compression of the spring.

7. Injection apparatus for the treatment of meat bodies, comprising as a new combination, means for supporting a meat body for treatment, a battery of hollow needles to pierce the body, each needle having a forward end portion provided with orifices for the release of treating fluid into the body, a transverse needle support structure comprising forward and rear upright spaced apart walls and including means to reciprocate the structure toward and from the meat body, a plurality of treating fluid supply tubes, each secured to the rear upright wall of the support structure and extending forwardly toward the forward wall, a valve unit upon the forward end of each tube including a valve body and a slide element in the unit body for movement axially of the adjacent tube, each slide element being operatively connected with a needle and each needle being slidably extended through the forward wall of the support structure whereby reciprocation of each needle and the valve slide element connected therewith relative to the valve unit body effects opening and closing of the valve unit, means for feeding treating fluid under pressure to each of said tubes, and means carried by the support structure and operatively connected with each needle for holding the valve unit in a prescribed working position relative to the forward wall of the support structure, and yielding when the needle is held from completing its forward movement by the support structure whereby the support structure and other needles may continue to move forward into the meat body to a predetermined position.

8. The invention according to claim 7, wherein the said valve units are each disposed adjacent to the trailing side of the said forward wall of the supporting structure when the needles are extended to their full length through the forward wall, and the last stated means comprises a coil spring encircling each of said tubes and interposed between the back wall of the needle supporting structure and the adjacent valve unit.

References Cited in the file of this patent

UNITED STATES PATENTS

| | | |
|---|---|---|
| 1,116,668 | Barringer | Nov. 10, 1914 |
| 1,987,349 | Rasmussen | Jan. 8, 1935 |
| 2,520,719 | Hanson | Aug. 29, 1950 |
| 2,560,060 | Zwosta | July 10, 1951 |
| 2,645,171 | Moreland | July 14, 1953 |
| 2,645,172 | Allbright et al. | July 14, 1953 |
| 2,796,017 | Schmidt | June 18, 1957 |